United States Patent
Tamiya

(10) Patent No.: US 8,065,643 B2
(45) Date of Patent: Nov. 22, 2011

(54) VERIFICATION SUPPORT APPARATUS, VERIFICATION SUPPORT METHOD, AND COMPUTER PRODUCT

(75) Inventor: Yutaka Tamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/356,689

(22) Filed: Jan. 21, 2009

(65) Prior Publication Data

US 2009/0282377 A1 Nov. 12, 2009

(30) Foreign Application Priority Data

May 9, 2008 (JP) .................................. 2008-123170

(51) Int. Cl.
*G06F 17/50* (2006.01)
(52) U.S. Cl. ........ 716/109; 716/106; 716/113; 716/132; 716/133
(58) Field of Classification Search .................. 716/106, 716/109, 132, 133, 113
See application file for complete search history.

(56) References Cited

U.S. PATENT DOCUMENTS

| 5,673,232 | A  | * | 9/1997  | Furutani ......................... 365/226 |
| 7,278,034 | B2 | * | 10/2007 | Shipton .......................... 713/300 |
| 2005/0159907 | A1 | * | 7/2005 | Chaudhry et al. ............... 702/60 |
| 2005/0160316 | A1 | * | 7/2005 | Shipton .......................... 714/22 |
| 2008/0086653 | A1 | * | 4/2008 | Wang ............................. 713/500 |

FOREIGN PATENT DOCUMENTS

JP   A 2003-330988   11/2003

* cited by examiner

*Primary Examiner* — Sun Lin
(74) *Attorney, Agent, or Firm* — Greer, Burns & Crain, Ltd.

(57) ABSTRACT

An effective data amount and a power index of a module selected from a design target circuit are extracted from a time-series table database (DB) for each clock cycle. Time periods during which the effective data amount is "0" and there is a high possibility of improving power consumption, are identified. It is determined whether a first simulation result from the design target circuit and a second simulation result from the design target circuit into which a control circuit has been inserted to stop supplying a clock to the module continuously for the identified time periods coincide. Then, if the first simulation result and the second simulation result coincide, the time periods are determined as targets to which a clock gating is applicable.

15 Claims, 11 Drawing Sheets

| MODULE | TIME-SERIES TABLE |
|---|---|
| M1 | T1 |
| M2 | T2 |
| ⋮ | ⋮ |
| Mi | Ti |
| ⋮ | ⋮ |
| Mn | Tn |

Ti

| TIME [$\mu$ sec] | EFFECTIVE DATA AMOUNT [bit] | POWER CONSUMPTION [$\mu$ W] | POWER INDEX [$\mu$ W/bit] |
|---|---|---|---|
| $t_1$ | 0 | 10 | 10 |
| $t_2$ | 100 | 1010 | 10 |
| $t_3$ | 0 | 300 | 300 |
| $t_4$ | 0 | 10 | 10 |
| $t_5$ | 0 | 10 | 10 |
| $t_6$ | 100 | 1010 | 10 |
| $t_7$ | 0 | 300 | 300 |
| $t_8$ | 0 | 10 | 10 |
| $t_9$ | 0 | 10 | 10 |
| $t_{10}$ | 100 | 1010 | 10 |
| $t_{11}$ | 0 | 300 | 300 |
| $t_{12}$ | 0 | 10 | 10 |

| TIME [μ sec] | CHANGING SIGNAL |
|---|---|
| ⋮ | ⋮ |
| $t_a$ | Out=123 |
| ⋮ | ⋮ |
| $t_b$ | PO = 234,PS=345 |
| ⋮ | ⋮ |
| $t_c$ | Out=567 |
| ⋮ | ⋮ |
| $t_d$ | PO = 678,PS=789 |

| TIME [μ sec] | CHANGING SIGNAL |
|---|---|
| 0 | ck_enab=1 |
| ⋮ | ⋮ |
| $t_a$ | ck_enab=0,Out=123 |
| ⋮ | ⋮ |
| $t_b$ | PO = 234,PS=345 |
| ⋮ | ⋮ |
| $t_c$ | ck_enab=1,Out=999 |
| ⋮ | ⋮ |
| $t_d$ | PO = 678,PS=789 |

```
1000 module clk_enab_module(ck_enab);
out ck_enab;
reg x;
parameter STEP = 1; // CLOCK CYCLE PERIOD
integer T;
always #STEP begin
   T = $time;
   if (t_3 <= T and T < t_4)
      ck_enab <= 0;
   else if (t_7 <= T and T < t_8)
      ck_enab <= 0;
   else if (t_11 <= T and T < t_12)
      ck_enab <= 0;
   else
      ck_enab <= 1;
   end
endmodule
```

FIG.11

```
force ck_enab    1
  stop -time t₃ us -execute {force ck_enab    0} -continue
  stop -time t₄ us -execute {force ck_enab    1} -continue
  stop -time t₇ us -execute {force ck_enab    0} -continue
  stop -time t₈ us -execute {force ck_enab    1} -continue
  stop -time t₁₁ us -execute {force ck_enab    0} -continue
  stop -time t₁₂ us -execute {force ck_enab    1} -continue
```

| CLOCK CYCLE | CHANGING SIGNAL |
|---|---|
| 1 | SEND = 1, DATA = 3 |
| 2 | WSTB = 1, WDATA = 1, RECV = 1 |
| . | . |
| . | . |
| . | . |
| p | WDATA = 3, RECV = 0 |
| . | . |
| . | . |
| . | . |
| q | WSTB = 0, SEND = 0 |

| INTERFACE NAME | TRANS- MISSION MODULE NAME | RECEPTION MODULE NAME | CONTROL CONDITION | DATA SIGNAL | NUMBER OF BITS | DEGREE OF IMPORTANCE |
|---|---|---|---|---|---|---|
| C1 | M1 | M2 | SEND&RECV | DATA[63:0] | 64 | 1 |
| ... | ... | ... | ... | ... | ... | ... |
| Cr | M7 | M8 | ERROR.rise | ERROR | 1 | 1000 |
| ... | ... | ... | ... | ... | ... | ... |
| Cs | | | | | | |

1300

1300-1, 1300-r, 1300-s

VERIFICATION SUPPORT APPARATUS, VERIFICATION SUPPORT METHOD, AND COMPUTER PRODUCT

CROSS REFERENCE TO RELATED APPLICATIONS

This application is based upon and claims the benefit of priority from the prior Japanese Patent Application No. 2008-123170, filed on May 9, 2008, the entire contents of which are incorporated herein by reference.

FIELD

The embodiment discussed herein is related to reducing power consumption in large scale integrated (LSI) circuits.

BACKGROUND

In recent years, with the increased density, scale, and driving speed of large-scale integrated (LSI) circuits, power consumption has also increased. Consequently, problems of reduced performance and shorter life expectancy due to heat generated by the LSI circuits have resulted. To solve such problems, it is necessary to reduce power consumption, for example, by accurately estimating power consumption during the design phase and taking appropriate measures such as circuit modification.

Conventionally, to achieve lower power consumption in LSI circuits, a technique of reducing power consumption by clock gating has been proposed. In clock gating, power consumption is decreased over an entire circuit by stopping the supply of a clock to a module that does not affect operation of the entire circuit.

Further, a design tool has been provided that automatically applies clock gating through operation analysis of the LSI circuit. In addition, Japanese Laid-Open Patent Application Publication No. 2003-330988 discloses a technique of detecting from hardware description, a register constituting a state machine and a register operating only when the state machine is in a non-idle state, and of automatically generating a gated clock supply circuit that supplies a gated clock to the registers.

However, with such a conventional technique employing the use of a design tool to apply clock gating, whether clock gating can be applied is determined through a detailed analysis of the operation of the LSI circuit. Accordingly, there is a problem in that the processing time and analysis load become enormous as circuit scale increases, leading to a prolonged design period.

In addition, according to such a conventional technique of detecting non-idle state states based on hardware description to automatically generate a circuit that supplies a gated clock to registers operating only when a state machine is in a non-idle state, there is a problem in that the burdensome task of checking the specification of the LSI circuit to define the idle states is place on the designer. Further, if a person other than the designer is in charge of reducing power consumption, a greater work load is placed on the person and the time required to achieve reductions in power consumption increases due to the extreme difficulty in defining idle states based on the specification.

SUMMARY

According to an aspect of an embodiment, a computer-readable recording medium stores therein a design support program that causes a computer to execute processing including: selecting arbitrarily a module from a design target circuit; extracting, by accessing a table, a data amount and a power index corresponding to the module selected at the selecting, the table storing therein time-series data amounts for data signals transmitted from modules in the design target circuit and received by recipient modules, and power indexes indicative of a potential of improving power consumption in the modules according to data amount; detecting from among time periods during which a recipient module does not receive a data signal, time periods during which the power index meets a criterion for improving power consumption, the detecting being based on the data amount and the power index extracted at the extracting; and outputting the time periods detected at the detecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram for explaining an example of a simulation result of a first design target circuit;
FIG. 8 is a diagram for explaining an example of a simulation result of a second design target circuit;
FIG. 11 is a diagram depicting an example of script;
FIG. 12 is a diagram depicting an example of a simulation result;
FIG. 13 is a diagram depicting an example of an interface table.

DESCRIPTION OF EMBODIMENT(S)

Preferred embodiments of the present invention will be explained with reference to the accompanying drawings.

Figure 1:
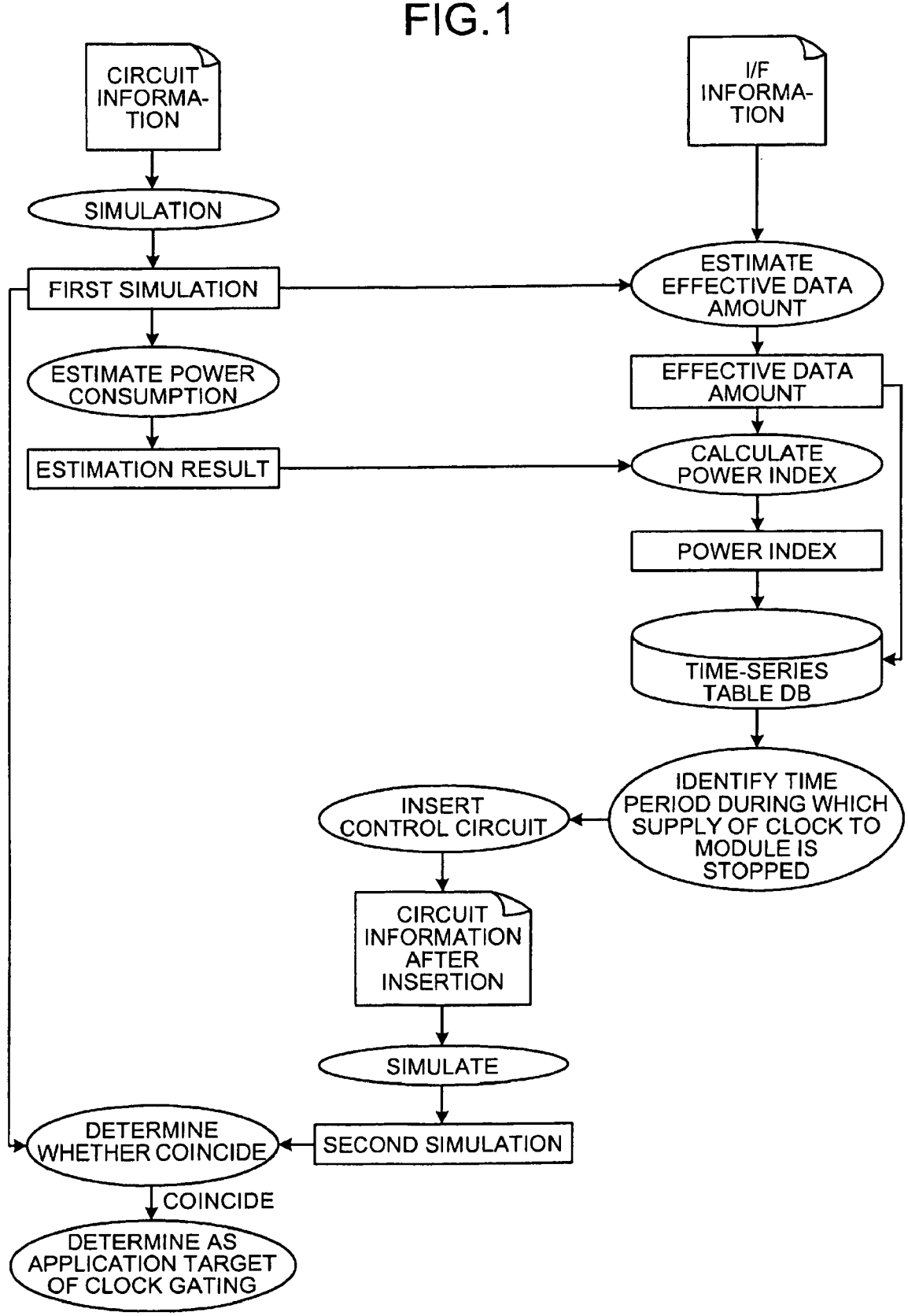
FIG. 1 is a schematic overview of an embodiment.

FIG. 1 is a schematic overview of an embodiment. As depicted in FIG. 1, circuit information for a circuit under design and subject to verification (design target circuit) is used to execute a simulation to verify operation of the design target circuit. Power consumption in each module of the design target circuit is estimated for each clock cycle based on a result of the simulation of the design target circuit (hereinafter, first simulation result).

Further, based on the first simulation result and interface information concerning communication between modules, the amount of data carried by a data signal transmitted from a module to a recipient module, and taken in by the recipient module (hereinafter, effective data amount) is calculated for each clock cycle, for each module. Subsequently, a power index is calculated for each module, for each clock cycle, using an estimate of the power consumption of the module and the effective data amount.

A power index here is an index indicative of the possibility of improving power consumption. Here, a larger power index indicates a larger amount of power being wastefully consumed and therefore, a higher possibility of improving power consumption. Meanwhile, a smaller power index indicates a smaller amount of power being wastefully consumed and therefore, a lower possibility of improving power consumption. The effective data amount and power index for each module at each clock cycle are stored in a time-series table database (DB).

Next, an arbitrary module is selected from the design target circuit. Then, the time-series table DB is accessed to extract the effective data amount and the power index for the selected module at each clock cycle (hereinafter, target module) and identify time periods during which the effective data amount is "0" and for which there is a high possibility of improving power consumption. The selection of an arbitrary module is repeated until the effective data amount and the power index has been extracted for all modules, i.e., until all the modules have been selected, for example.

Subsequently, circuit information is generated for the design target circuit to additionally include a control circuit that stops the supply of a clock to the target module continuously for the identified time periods. Then, the generated circuit information is used to execute a simulation to verify operation of the design target circuit that additionally includes the control circuit.

It is determined whether the result of the simulation of the design target circuit that additionally includes the control circuit (hereinafter, second simulation result) and the first simulation result coincide. If the first and the second simulation results coincide, the target module is determined as a target for the application of clock gating.

The time periods during which clock gating is applied to the target module include time periods during which the effective data amount is "0" and for which there is a high possibility of improving power consumption. Conversely, if the first and the second simulation results do not coincide, the target module is excluded from being a target for the application of clock gating.

Accordingly, it is possible to identify a module to which clock gating can be applied and the time periods during which the supply of a clock to the module is stopped. In addition, since there is a high possibility of improving power consumption during the time periods when clock gating is applied, it is possible to effectively reduce power consumption in the entire circuit.

In general, a module in a design target circuit consumes electrical power for communication with other modules, and also consumes electrical power due to clock gating omission and for unnecessary internal communication (with a local memory or a sub-module).

Among the foregoing kinds of power consumption in the module, decreasing the power consumption due to clock gating omission and/or for unnecessary internal communication will lead to power reduction in the entire circuit. In addition, if wasteful power consumption due to clock gating omission and/or for unnecessary internal communication occupies a larger proportion of the overall power consumption in the module, the module has lower power efficiency.

That is, if the proportion of power consumption in a module for communications with other modules is larger with respect to overall power consumption, the module has greater power efficiency. Here, power consumption for communication with other modules increases in proportion to the effective data amount of a data signal transmitted and received.

Therefore, it is possible to determine whether a module, as a transmission source, is high in power efficiency depending on whether the effective data amount of a data signal transmitted and received between modules is appropriate with respect to the power consumption of the module. In addition, highly effective improvement of power consumption can be expected by identifying modules that are low in power efficiency as a target for improvement.

The effective data amount can be determined based on the result of the simulation of the design target circuit (the first simulation result) and the interface information defining transmission and reception of a data signal between modules for each module interface in the design target circuit.

In addition, a power index for each module can be determined based on the power consumption at each clock cycle and the effective data amount at each clock cycle. Specifically, a power index for each module can be determined for each clock cycle by dividing the power consumption at each clock cycle by the effective data amount at each clock cycle, for each module, for example.

In this case, the larger the power index, the higher the possibility of improving power consumption becomes, and the smaller the power index, the lower the possibility of improving power consumption becomes. That is, a highly effective improvement can be expected by identifying a module having a large power index as a target for improving power consumption.

Accordingly, in this embodiment, a power index indicative of the possibility of improving power consumption is used to narrow down time periods during which clock gating may be applied to time periods for which highly effective improvement can be expected. Further, it is determined whether clock gating can be applied by checking operation of the design target circuit when the supply of a clock to the target module is stopped continuously for the time periods for which highly effective improvement can be expected.

A method for calculating a power index is not limited to the foregoing. For example, a power index for each cycle may be determined by dividing the effective data amount by the power consumption at each clock cycle. In this case, the larger the power index, the lower wasteful power consumption becomes, and the smaller the power index, the higher wasteful power consumption becomes.

Figures 2, 3:
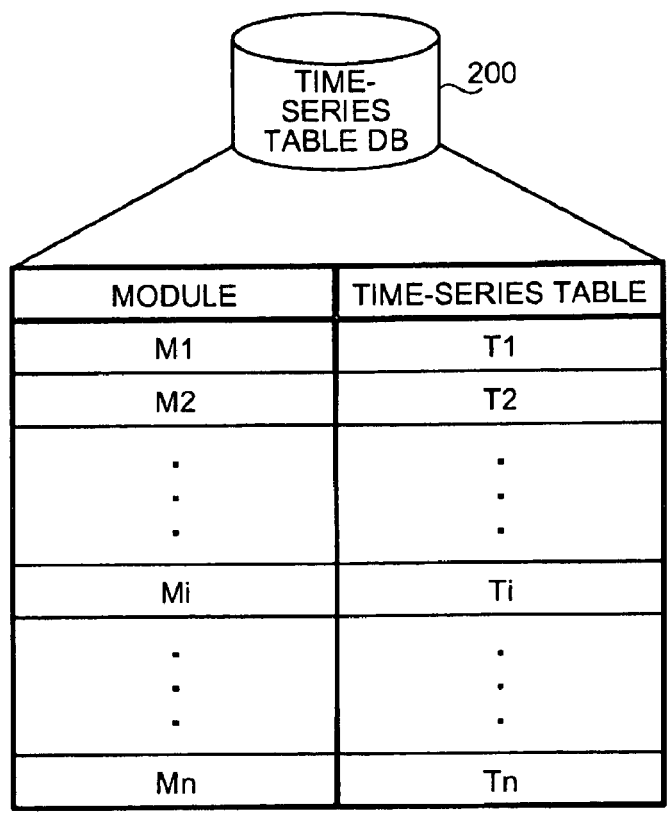
FIG. 2 is a diagram depicting contents of a time-series table DB.
FIG. 3 is a diagram depicting one example of the time-series table.

FIG. 2 is a diagram depicting contents of the time-series table DB. As depicted in FIG. 2, the time-series table DB 200 stores time-series tables T1 to Tn that indicate temporal changes in the effective data amounts and power indexes of modules M1 to Mn in the design target circuit.

Specifically, respectively for each of the modules M1 to Mn in the design target circuit, the time-series tables T1 to Tn store effective data amounts, power consumption values, and power indexes for given times during a simulation. Here, the foregoing time refers to a variable indicative of a time during a simulation (e.g. a clock cycle) and thus is different from an actual time.

Taking a module Mi as an example, stored contents of a time-series table Ti will be explained below. FIG. 3 is a diagram depicting one example of the time-series table. As depicted in FIG. 3, the time-series table Ti stores effective data amounts, power consumption values, and power indexes of the module Mi for times $t_1$ to $t_{12}$.

In the diagram, a time $t_j$ (j=1, 2, ... 12) denotes a time that is "equal to or more than $t_1$ and less than $t_j+1$". Taking $t_2$ as an example, the effective data amount of the module Mi is 100 bits, the power consumption is 1010 microwatts, and the power index is 10 microwatts/bit.

Figure 4:
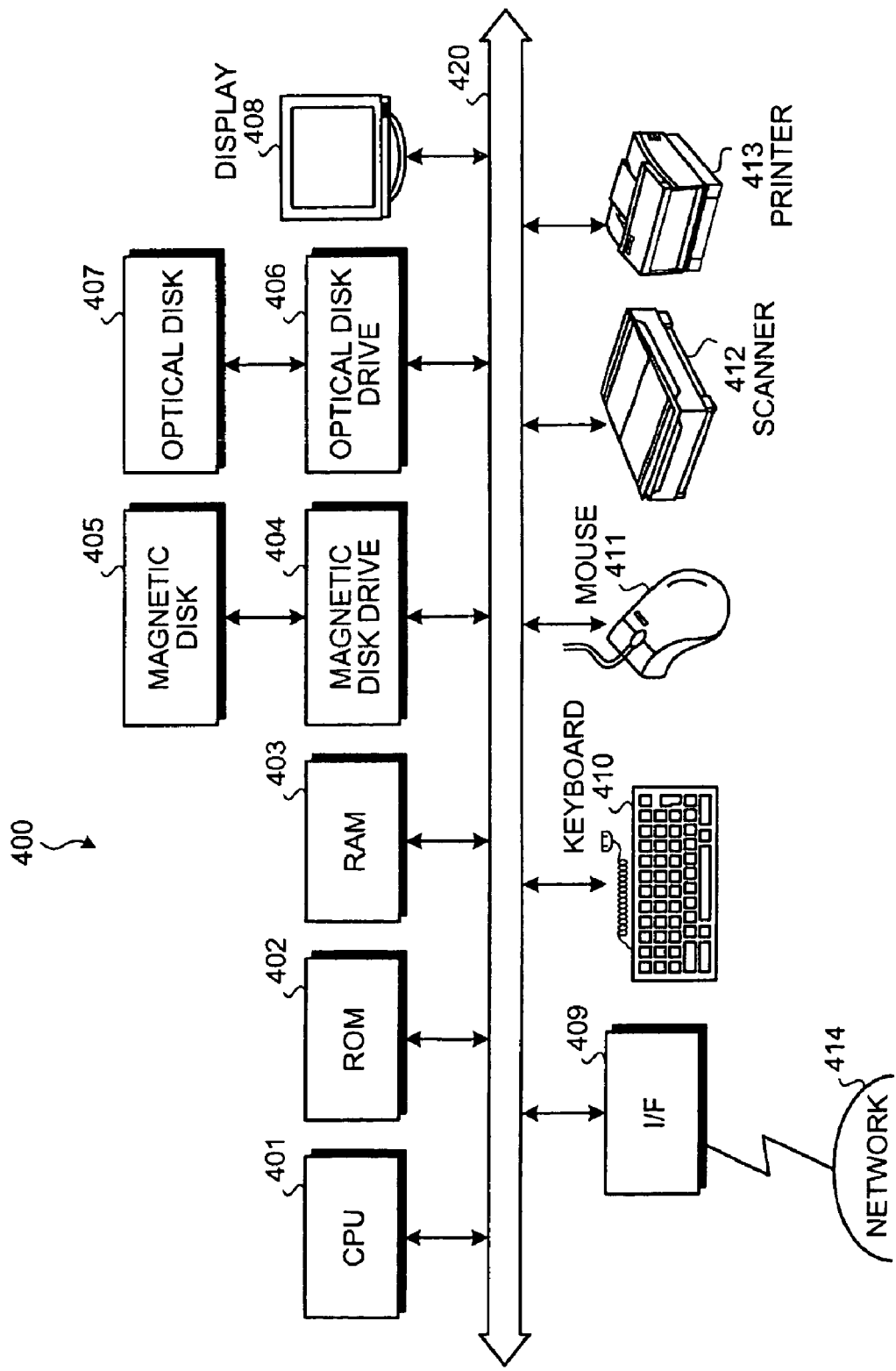
FIG. 4 is a block diagram of a design support apparatus according to the embodiment.

FIG. 4 is a block diagram of a design support apparatus according to the embodiment. As depicted in FIG. 4, the design support apparatus 400 includes a central processing unit (CPU) 401, a read-only memory (ROM) 402, a random access memory (RAM) 403, a magnetic disc drive 404, a magnetic disc 405, a optical disc drive 406, an optical disc 407, a display 408, an interface (I/F) 409, a keyboard 410, a mouse 411, a scanner 412, and a printer 413, connected to one another by way of a bus 420.

The CPU 401 governs overall control of the design support apparatus 400. The ROM 402 stores therein programs such as a boot program. The RAM 403 is used as a work area of the CPU 401. The magnetic disc drive 404, under the control of the CPU 401, controls reading/writing of data from/to the magnetic disc 405. The magnetic disc 405 stores therein the data written under control of the magnetic disc drive 404.

The optical disc drive 406, under the control of the CPU 401, controls reading/writing of data from/to the optical disc 407. The optical disc 407 stores therein the data written under control of the optical disc drive 406, the data being read by a computer.

The display 408 displays a cursor, an icon, a tool box, and data such as document, image, and function information. The display 408 may be, for example, a cathode ray tube (CRT), a thin-film-transistor (TFT) liquid crystal display, or a plasma display.

The I/F 409 is connected to a network 414 such as a local area network (LAN), a wide area network (WAN), and the Internet through a telecommunications line and is connected to other devices by way of the network 414. The I/F 409 manages the network 414 and an internal interface, and controls the input and output of data from and to external devices. The I/F 409 may be, for example, a modem or a local area network (LAN) adapter.

The keyboard 410 is equipped with keys for the input of characters, numerals, and various instructions, and data is entered through the keyboard 410. The keyboard 410 may be a touch-panel input pad or a numeric keypad. The mouse 411 performs cursor movement, range selection, and movement, size change, etc., of a window. The mouse 411 may be a trackball or a joystick provided the trackball or joystick has similar functions as a pointing device.

The scanner 412 optically reads an image and takes in the image data into the design support apparatus 400. The scanner 412 may have an optical character recognition (OCR) function as well. The printer 413 prints image data and document data. The printer 413 may be, for example, a laser printer or an ink jet printer.

Figure 5:
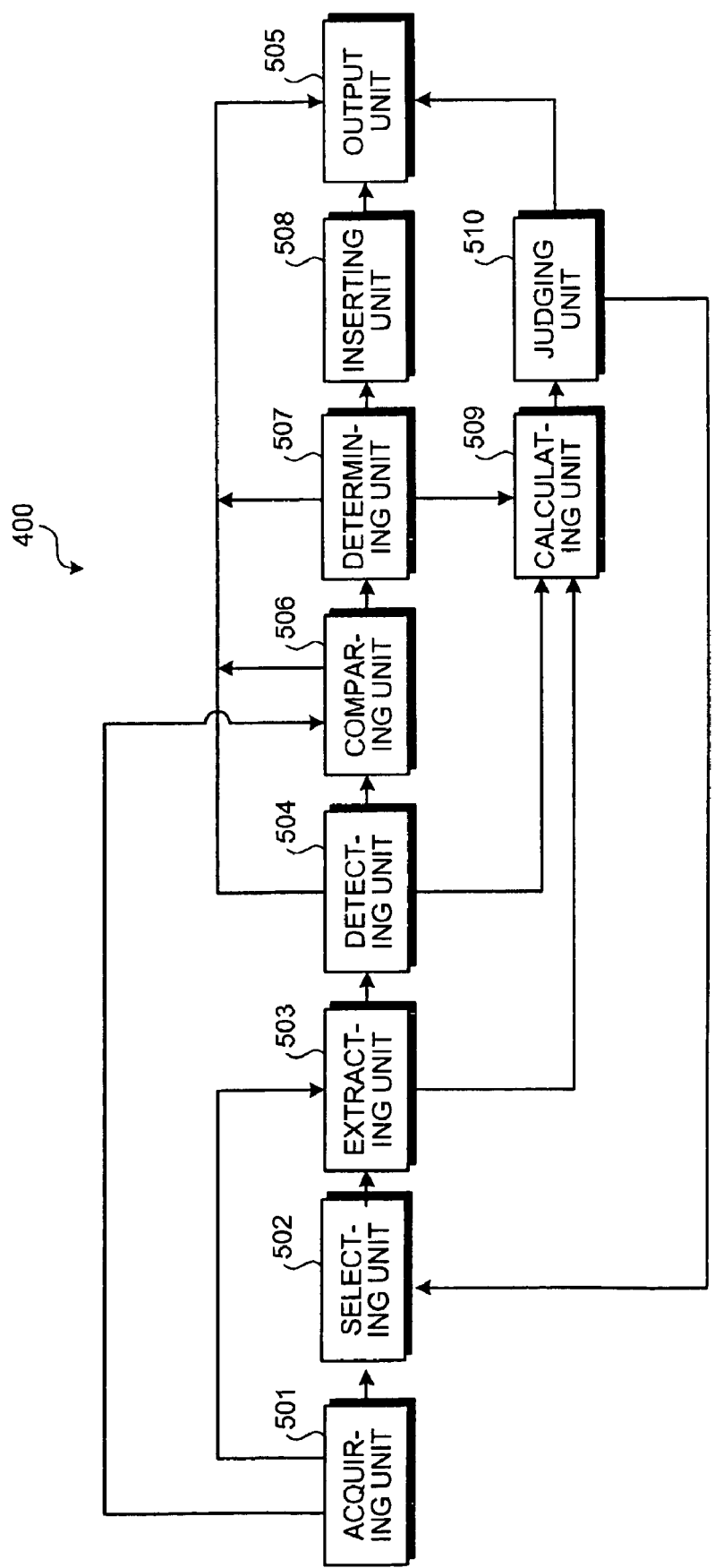
FIG. 5 is a block diagram of a functional configuration of the design support apparatus.

FIG. 5 is a block diagram of a functional configuration of the design support apparatus. As depicted in FIG. 5, the design support apparatus 400 includes an acquiring unit 501, a selecting unit 502, an extracting unit 503, a detecting unit 504, an output unit 505, a comparing unit 506, a determining unit 507, an inserting unit 508, a calculating unit 509, and a judging unit 510.

Control functions (the acquiring unit 501 to the judging unit 510) are realized by causing the CPU 401 to execute programs stored in a storage area such as the ROM 402, the RAM 403, the magnetic disk 405, or the optical disk 407 depicted in FIG. 4, or through the use of the I/F 409, for example. In addition, data output from these functional units (the acquiring unit 501 to the judging unit 510) is stored in the above storage area. Further, a functional unit at a connection destination indicated by an arrow in FIG. 5 reads, from the storage areas, data output from the functional unit at a connection source, to thereby cause the CPU 401 to execute programs related to the function.

The acquiring unit 501 has a function of acquiring circuit information concerning the design target circuit. The circuit information here is a net list of the design target circuit after logic synthesis, for example. The net list describes, in a hardware description language such as Verilog or Very High Speed Integrated Circuit Hardware Description Language (VHDL), connection relationships in the design target circuit between modules and internal cells thereof (such as flip-flops (FFs) and RAMs). The circuit information may be input directly to the design support apparatus 400 or may be acquired from an external computer apparatus.

The acquiring unit 501 has a function of acquiring, for each of the modules M1 to Mn, a time-series effective data amount for data signals transmitted and received between the modules M1 to Mn in the design target circuit, and a power index indicating the possibility of improving power consumption in the modules M1 to Mn.

Specifically, for example, the acquiring unit 501 accesses the time-series table DB 200 depicted in FIG. 2 to acquire the time-series tables T1 to Tn for the modules M1 to Mn, respectively. The time-series table DB 200 may be included in the design support apparatus 400 or an external computer apparatus. If the time-series table DB 200 is included in the design support apparatus 400, the time-series table DB 200 is implemented by storage areas such as the RAM 403, the magnetic disk 405, and the optical disk 407.

The selecting unit 502 has a function of selecting an arbitrary module from the design target circuit. Specifically, the selecting unit 502 selects an arbitrary module from the design target circuit, based on names of the modules described in the net list acquired by the acquiring unit 501, for example. A name is a designation uniquely identifying a module.

The extracting unit 503 has a function of accessing the time-series table DB 200 and extracting an effective data amount and a power index corresponding to the module selected by the selecting unit 502 (target module). For example, if the module Mi is selected from the design target circuit, the extracting unit 503 extracts, from the time-series table DB 200, the time-series table Ti depicted in FIG. 3.

The detecting unit 504 has a function of detecting, from among time periods during which a recipient module does not receive a data signal, a time period during which the power index meets a criterion for improving power consumption, the detecting unit 504 detecting the time period based on the data amount and power index extracted by the extracting unit 503. The criterion for improving power consumption here refers to a criterion for potentially improving power consumption.

Specifically, the criterion for improving power consumption may be designated by the power index, for example. Under this standard, the larger the power index is, the higher the possibility of improving power consumption becomes. Accordingly, the detecting unit 504 may detect from among the time periods during which a recipient module does not receive a data signal, a time period during which the power index is equal to or more than a predetermined threshold.

The foregoing threshold may be arbitrarily set by a user through manipulation of the keyboard 410 or the mouse 411 depicted in FIG. 4. Although, with a lower threshold, a greater improvement in power consumption can be expected, there is a trade-off in that the processing time increases. Accordingly, with consideration of the targeted product quality and the period between fabrication of the product and introduction to the market, a user may set an appropriate threshold value.

If a smaller power index indicates a higher possibility of improving power consumption, the detecting unit 504 detects from among the time periods during which a recipient module does not receive a data signal, a time period during which the power index is equal to or less than the predetermined threshold.

Alternatively, the criterion for improving power consumption may be designated by relatively evaluating the power indexes. Specifically, the detecting unit 504 may detect from among the time periods during which a recipient module does not receive a data signal, time periods during which the power indexes are relatively higher X indexes (or higher Y percentages). The foregoing X and Y can be arbitrarily set.

Figure 6:
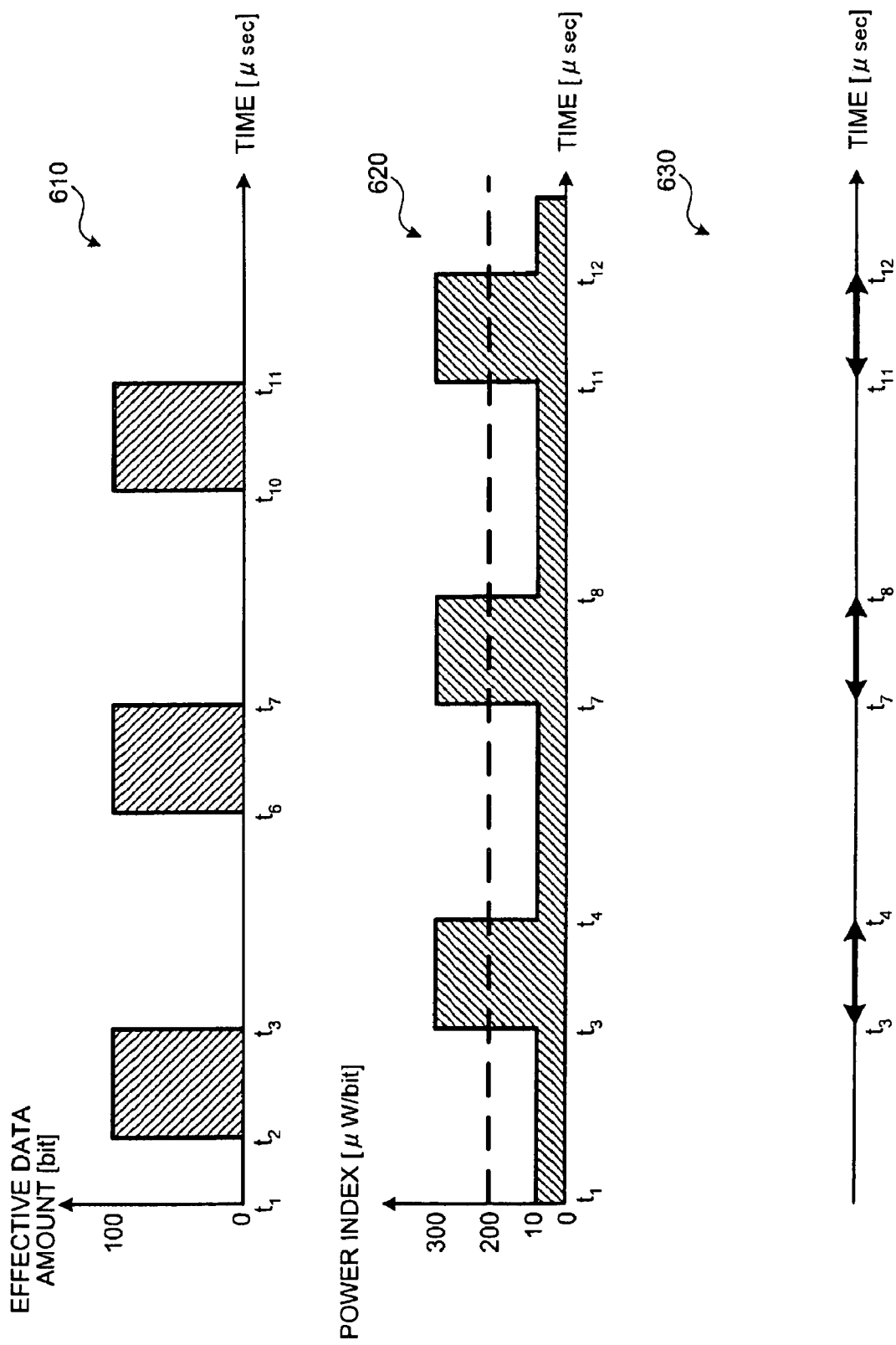
FIG. 6 is a diagram outlining a detecting process.

An outline of detecting process by the detecting unit 504 will be explained below. This explanation an example a situation where the detecting unit 504 extracts from among the time periods during which a recipient module does not receive a data signal, time periods during which the power index is equal to or more than a predetermined threshold. FIG. 6 is a diagram outlining the detecting process.

A graph 610 depicted in FIG. 6, represents temporal changes in the effective data amount of the module Mi, and a graph 620 represents temporal changes in the power index of the module Mi. As depicted in the graph 620, a power index threshold of "200 microwatts/bit" is set as a criterion for improving power consumption (indicated by a dotted line in the graph).

In this example, the detecting unit 504 detects from among the time periods during which a recipient module does not receive a data signal "$t_1$ to $t_2$, $t_3$ to $t_6$, $t_7$ to $t_{10}$, and $t_{11}$ to $t_{12}$", time periods during which the power index is 200 or more, i.e., "$t_3$ to $t_4$, $t_7$ to $t_8$, and $t_{11}$ to $t_{12}$", (a graph 630 depicted in FIG. 6).

During these time period "$t_3$ to $t_4$, $t_7$ to $t_8$, and $t_{11}$ to $t_{12}$", the recipient module does not take in a data signal and there is a high possibility of improving power consumption. In other words, during the time periods during which the recipient module does not take in a data signal, there is a high possibility that operation of the verification target circuit will not change, even if the supply of a clock to the target module is stopped continuously for the time periods. That is, the detecting unit 504 uses the power index indicative of the possibility of improving power consumption to detect time-period candidates during which clock gating may be applied and for which highly effective power consumption reduction can be expected.

The output unit 505 has a function of outputting the time periods detected by the detecting unit 504. Specifically, the output unit 505 may output the time periods detected by the detecting unit 504 as time periods during which clock gating is applied, correlated with the name of the target module, thereby enabling a user to recognize time periods during which there is a high possibility that clock gating omission occurs at the target module.

The form of output by the output unit 505 may be, for example, any one of display on the display 408, print-out by the printer 413, and transmission through the I/F 409 to an external apparatus. Alternatively, the output unit 505 may store in the storage areas such as the RAM 403, the magnetic disk 405, and the optical disk 407.

The comparing unit 506 has a function of comparing results of simulations in which the same data signal is applied to the design target circuit (hereinafter, first design target circuit) and the design target circuit additionally having a control circuit to stop the supply of a clock to the target module continuously for the time periods detected by the detecting unit 504 (hereinafter, second design target circuit).

The simulation results may be given as a value change dump (VCD) file indicating signals (control signals, data signals) that change in value at each clock cycle, for example.

Simulations for verifying operation of the first and the second design target circuits may be executed in the design support apparatus 400 or in an external computer apparatus (simulator). In the latter, the acquiring unit 501 acquires the simulation results from the external computer apparatus.

FIG. 7 is a diagram for explaining an example of the simulation result of the first design target circuit, and FIG. 8 is a diagram for explaining an example of the simulation result of the second design target circuit.

In FIG. 7, the simulation result 700 indicates, in a time-series manner, signals that change in value during the simulation of the first design target circuit. For example, at time $t_b$ microsecond, a data signal "PO" changes in value to "234" and a data signal "PS" changes in value to "345".

As depicted in FIG. 8, a simulation result 800 indicates, in a time-series manner, signals that change in value during the simulation of the second design target circuit. For example, at a time $t_a$ microsecond, a control signal "ck_enab" changes in value to "0" and a data signal "Out" changes in value to "123".

Although, in the simulation results 700 and 800, only the signals that change in value are retained at each time t, other signals may be retained indicating values at the previous time t. In this case, the simulation results 700 and 800 retain the values of all signals for each time t.

The output unit 505 further has a function of outputting a result of comparison performed by the comparing unit 506. Specifically, the outputting unit 505 may output the result of comparison, correlating corresponding signal names and signal values, for each time t in the simulation results 700 and 800 where a signal value has changed.

The inserting unit 508 has a function of inserting, into the design target circuit, a control circuit that stops the supply of a clock to the target module continuously for the time periods detected by the detecting unit 504, the inserting unit 508 inserting the control circuit based on the result of comparison performed by the comparing unit 506.

Figures 9, 10:
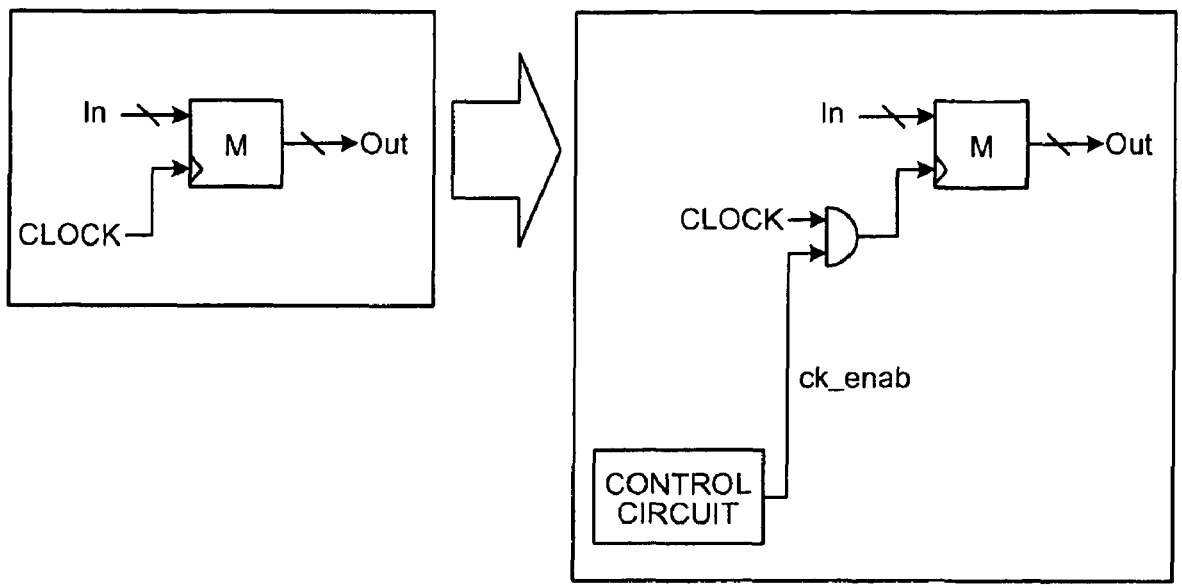
FIG. 9 is a diagram for explaining an example of a control circuit.
FIG. 10 is a diagram depicting circuit information of the control circuit.

FIG. 9 is a diagram for explaining an example of the control circuit. As depicted in FIG. 9, an AND gate is inserted into a path that supplies a clock to a module M. The inserting unit 508 further inserts a control circuit that outputs "ck_enab=0" continuously during the time periods detected by the detecting unit 504. During the time periods other than the time periods detected by the detecting unit 504, the control circuit outputs "ck_enab=1".

Thus, the clock supplied to the module M can remain unchanged continuously during the time periods detected by the detecting unit 504, thereby simulating a state in which the supply of a clock to the target module is stopped.

A method of implementing the control circuit as part of the design target circuit will be explained. FIG. 10 is a diagram depicting circuit information of the control circuit. As depicted in FIG. 10, circuit information 1000 describes, in Verilog, a function of the control circuit that stops the supply of a clock to the module Mi continuously for the time periods "$t_3$ to $t_4$, $t_7$ to $t_8$, and $t_{11}$ to $t_{12}$" detected by the detecting unit 504. T denotes simulation time.

By adding the description in the circuit information 1000 to the circuit information of the design target circuit (described in Verilog), it is possible to implement a control circuit that stops the supply of a clock to the module Mi continuously for the foregoing time periods).

Next, a method of implementing a control circuit by a script of an execution tool for executing simulation of the second design target circuit will be explained. FIG. 11 is a diagram depicting an example of the script. As depicted in FIG. 11, a script 1100 describes a command for stopping the supply of a clock to the module Mi continuously for the time periods "$t_3$ to $t_4$, $t_7$ to $t_8$, and $t_{11}$ to $t_{12}$" detected by the detecting unit 504.

Specifically, an initial value "1" is assigned to "ck_enab". Subsequently, the simulation is temporarily stopped at the times "$t_3$, $t_7$, and $t_{11}$" to change the value of "ck_enab" to "0", and then the simulation is resumed. In addition, the simulation is temporarily stopped at the times "$t_4$, $t_8$, and $t_{12}$" to change the value of "ck_enab" to "1", and then the simulation is resumed.

By the foregoing method, it is possible to implement a control circuit that stops the supply of a clock to the module Mi continuously for the foregoing time periods, as a script controlling operation of the simulation.

Depicted in FIG. 5, the determining unit 507 has a function of determining, based on the result of comparison performed by the comparing unit 506, whether the values of a data signal (designated as an inspection target) before and after the insertion of the control circuit that stops the supply of a clock to the target module coincide. The data signal designated as an inspection target may be arbitrarily set by a user through manipulation of the keyboard 410 or the mouse 411.

Specifically, a data signal transmitted from the target module may be designated as an inspection target. This is because, when the values of a signal output from the target module before and after the insertion of the control circuit coincide, it is assured that there is also coincidence in the operation of the overall design target circuit before and after the insertion. A signal output from the target module is referred to as "Out".

Here, by referencing the result of comparison between the simulation results 700 and 800 depicted in FIGS. 7 and 8, the determining unit 507 determines whether the values of "Out" (designated as an inspection target) before and after the insertion of the control circuit coincide. In this example, the values of "Out" are not the same at the time $t_c$ and thus, it is determined that the values of the data signal, designated as an inspection target, do not coincide.

Alternatively, if a signal output from the target module may not have been used at the previous gate, a data signal output from the design target circuit may be designated as an inspection target. This approach is based on an idea that coincidence in the operation of the entire circuit can be sufficiently determined by checking for coincidence of values of a signal output to an external destination. Here, a signal output from the design target circuit is referred to as "PO".

In this case, by referencing the result of comparison between the simulation results 700 and 800, the determining unit 507 determines whether the values of "PO" designated as an inspection target coincide. Here, since values of "PO" are the same at the time $t_b$, it is determined that the values of the data signal, designated as an inspection target, coincide.

In addition, if a signal output from the design target circuit to an external destination is designated as an inspection target, coincidence is determined for plural times (the times $t_b$ and $t_d$ in the foregoing example). Therefore, a combination of a signal output from the design target circuit to an external destination and an internal signal of the design target circuit indicative of the state of the entire circuit (a data signal output from a circuit element in the design target circuit) may be designated as an inspection target. Here, an internal signal is referred to as "PS".

In this case, the determining unit 507, by referencing the result of comparison between the simulation results 700 and 800, determines whether values of "PO" and "PS" designated as inspection targets coincide in the simulation results 700 and 800. Here, since the values of "PO" and "PS" are the same at the time $t_b$ and $t_d$, it is determined that the values of the data signals designated as an inspection target coincide.

In such a manner as described above, it is possible to determine coincidence at fewer times as compared with designating a signal output from the design target circuit to an external destination as an inspection target, to thereby reduce the processing time for the determination. Times for the determination of coincidence depend on the internal signal selected.

The output unit 505 may output a result of determination made by the determining unit 507, thereby enabling a user to determine whether clock gating can be applied to the target module.

The inserting unit 508 may insert a control circuit into the design target circuit if the determining unit 507 determines that the values of the data signal designated as an inspection target coincide. That is, if there is no change in the operation of the design target circuit even when the supply of a clock to the target module is stopped, the inserting unit 508 automatically inserts the control circuit into the design target circuit.

The output unit 505 may output the design target circuit that additionally includes the control circuit inserted by the inserting unit 508. Specifically, the output unit 505 outputs circuit information in which the circuit information 1000 describing the function of the control circuit that stops the supply of a clock to the module Mi, is added to the circuit information of the design target circuit, for example. Thus, the design target circuit can be provided, where clock gating is applied to target modules.

The extracting unit 503 may access the time-series table DB 200 and extract a value indicative of power consumption in the target module. Specifically, if the module Mi is selected from the design target circuit, the extracting unit 503 extracts the time-series table Ti from the time-series table DB 200, for example.

The calculating unit 509 has a function of cumulating values indicative of power consumption in the target module during the time periods detected by the detecting unit 504 and calculating, based on the values indicative of power consumption extracted by the extracting unit 503, a value indicative of power consumption improved by the insertion of the control circuit. Specifically, the calculating unit 509 identifies values indicative of power consumption in the target module during the time periods detected by the detecting unit 504, based on the values indicative of power consumption extracted by the extracting unit 503.

In the foregoing example of the module Mi, the calculating unit 509 identifies the power consumption values "300, 300, and 300" corresponding to the time periods "$t_3$ to $t_4$, $t_7$ to $t_8$, and $t_{11}$ to $t_{12}$", respectively, from the time-series table Ti. Then, the calculating unit 509 cumulates the identified power consumption values "300, 300, and 300" and calculates a value of the power consumption improved by the insertion of the control circuit "900".

The output unit 505 may output the value of power consumption calculated by the calculating unit 509. Specifically, the output unit 505 outputs the value of power consumption improved by the insertion of the control circuit (e.g. 900 microwatts) correlated with the name of the target module, for example. Thus, a user can know the value of power consumption improved by the application of clock gating.

The judging unit 510 has a function of judging whether the value of power consumption calculated by the calculating unit 509 is at least equal to a threshold. If values of power consumption improved by the insertion of the control circuit are calculated for plural target modules, the judging unit 510 judges whether a value of power consumption obtained by cumulating the values of power consumption is at least equal to the threshold.

The selecting unit 502 may select an unselected module from the design target circuit if the judging unit 510 does not judge that the value of power consumption is equal to or more than the threshold. Accordingly, it is possible to search for a clock gating omission until the value of power consumption calculated by the calculating unit 509 becomes equal to or more than the threshold or until all modules have been selected.

The threshold can be arbitrarily set by a user through manipulation of the keyboard 410 or the mouse 411. Although, with a lower threshold, a greater improvement in power consumption can be expected, there is a trade-off in that the processing time increases. Accordingly, with consideration of the targeted product quality and the period between fabrication of the product and introduction to the market, a user may set an appropriate threshold value.

The output unit 505 may output the design target circuit that additionally includes the control circuit when the judging unit 510 judges that the value of power consumption is equal to or more than the threshold. Accordingly, the design target circuit satisfying a preset goal of improving power consumption can be provided.

The selecting unit 502 may select a module having a specific power consumption value or more from the design target circuit. Specifically, the selecting unit 502 accesses the time-serious table DB 200 to cumulate values power consumption of each module for each time to determine a value of total power consumption in the module, and selects a module having at least a given value of power consumption, for example.

More specifically, the selecting unit 502 may select a module having an arbitrarily set specific power consumption value or more, or may select a module having highest power consumption value. Accordingly, it is possible to select a module in which significant improvement of power consumption can be expected by the application of clock gating.

The extracting unit 503 may extract a value of power consumption only if the determining unit 507 determines that values of a data signal designated as an inspection target coincide. Accordingly, it is possible to reduce wasteful processing in which a value of power consumption is calculated even if clock gating is inapplicable.

The effective data amount is calculated from the simulation result of the design target circuit (equivalent to the first simulation result) and interface information (an interface table explained hereinafter).

FIG. 12 is a diagram depicting an example of a simulation result. As depicted in FIG. 12, a simulation result 1200 includes signal information items 1200-1 to 1200-$q$ indicative of signals changing in value at each clock cycle. For example, for 1200-$p$, at a clock cycle p, the value of a data signal "WDATA" changes to "3" and the value of a control signal "RECV" changes to "0".

FIG. 13 is a diagram depicting an example of an interface table. As depicted in FIG. 13, an interface table 1300 includes interface information items 1300-1 to 1300-$s$ that define the transmission and the reception of data signals between modules for module interfaces C1 to Cs, respectively.

Specifically, the interface information items 1300-1 to 1300-$s$ include interface names, transmission module names, reception module names, control conditions, data signals, bit numbers, and degrees of importance, for the module interfaces C1 to Cs, respectively. The interface names are designations uniquely identifying the module interfaces C1 to Cs connecting the modules.

The transmission module names are designations uniquely identifying transmission modules. The receiving module names are designations uniquely identifying receiving modules. The control conditions refer to conditions for establishing data communications between modules. The data signals refer to data signals to be transmitted and received. The bit numbers refer to data amounts of data signals. The degrees of importance refer to indexes representing degrees of importance of the data signals.

Figure 14:
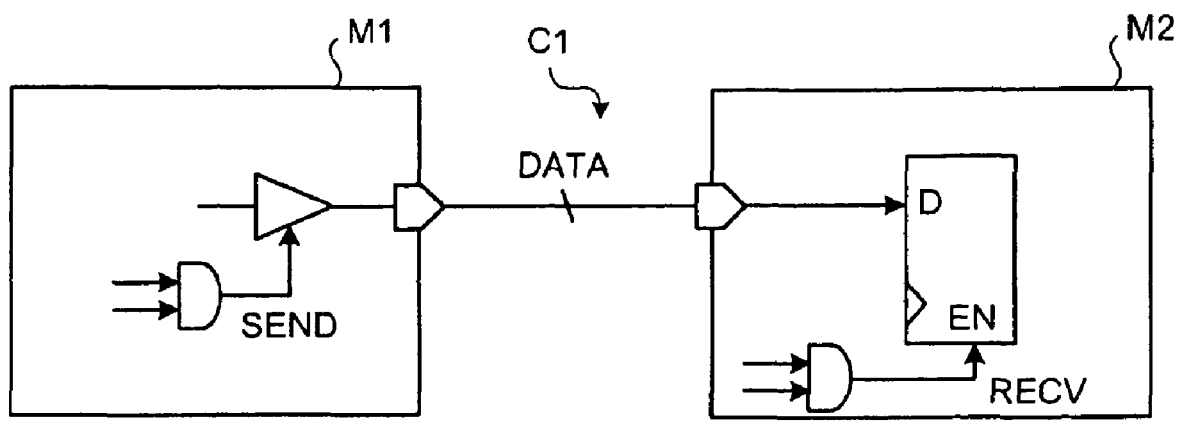
FIG. 14 is a diagram outlining communication between modules.

Taking the interface information item 1300-1 as an example, data communication between modules will be explained. FIG. 14 is a diagram outlining communication between modules. As depicted in FIG. 14, the modules M1 and M2 are communicable connected via the module interface C1.

The interface information item 1300-1 includes a control condition "SEND&RECV" to establish communication between the modules M1 and M2 connected via the module interface C1. This control condition indicates that communication between the modules M1 and M2 is established when both of control signals "SEND" and "RECV" have changed.

Specifically, the module M1 transmits a data signal "DATA 63:0" when the value of the control signal "SEND" changes from 0 to 1. The module M2 receives the data signal "DATA 63:0" when the value of the control signal "RECV" changes from 0 to 1. In "DATA 63:0", 63:0 defines the number of bits.

In addition, the module M1 stops transmission of the data signal "DATA 63:0" when the value of the control signal "SEND" changes from 1 to 0. The module M2 stops reception of the data signal "DATA 63:0" when the control signal "RECV" changes from 1 to 0.

The degree of importance of the data signal "DATA 63:0" is 1, the lowest degree of importance. For example, a degree of importance of 1000 for a data signal "ERROR" depicted in the interface information item 1300-$r$ means that the data signal "ERROR" is 1000 times more important than the data signal "DATA 63:0".

A method of calculating an effective data amount will be explained below with reference to the simulation result 1200 and the interface table 1300. In calculating an effective data amount, first, it is determined, for the module interfaces C1 to Cs, respectively, whether control signals coincide between the signal information items 1200-1 to 1200-$q$ and the interface information items 1300-1 to 1300-$s$.

Taking the module interface C1 as an example, it is determined whether control signals specified by the signal information items 1200-1 to 1200-$q$ and the control signals "SEND" and "RECV" defined in the control condition "SEND&RECV" coincide. More specifically, it is determined whether the control signals coincide at each clock cycle 1 to q.

First, according to the signal information item 1200-1, the control signal "SEND" changes from 0 to 1 at the clock cycle 1. Therefore, it is determined that, among the control signals "SEND" and "RECV" defined in the control condition "SEND&RECV", only the control signal "SEND" coincides.

Next, according to the signal information item 1200-2, the control signal "RECV" changes from 0 to 1 in the clock cycle 2. Therefore, it is determined that the control signals "SEND" and "RECV" changing in value at the clock cycles 1 and 2 and the control signals "SEND" and "RECV" defined in the control condition "SEND&RECV" coincide.

If it is determined that there is a match between the control signals, the number of times the control condition is satisfied, is counted. In the foregoing example, if it is determined that the control signals "SEND" and "RECV" coincide, the number of times the control condition "SEND&RECV" in the module interface C1 is satisfied, is incremented.

Thus, it is determined, for each the module interface C1 to Cs indicated in the interface information items 1300-1 to 1300-s, respectively, whether the control signals coincide in at the clock cycle 1 to q indicated in the signal information items 1200-1 to 1200-q. Then, each time it is determined that control signals coincide, the number of times the control condition is satisfied, is counted.

Subsequently, an effective data amount of the data signal transmitted from the transmission module is calculated using a result of counting and the number of bits of the significant data signal transmitted and received between the modules when the control condition is satisfied. Specifically, the effective data amount can be calculated for each of the transmission modules by using equation 1 indicated below, for example. In equation 1, F denotes the number of times the control condition is satisfied, and B denotes the number of bits of the data signal transmitted and received between modules when the control condition is satisfied.

$$Di = F \times B \quad (1)$$

For example, if the number of times the control condition "SEND&RECV" of the module interface C1 is satisfied is 10 (count value is 10), the effective data amount of the module M1 (640 bits) can be calculated by substituting the number of times the control condition is satisfied, "10", and the number of bits of the data signal, "64", into the equation 1.

Alternatively, the effective data amount may be calculated with consideration of not only the number of bits of a data signal but also with consideration of the degree of importance of the data signal. Specifically, the effective data amount of each module can be calculated using equation 2 indicated below, for example. In equation 2, I denotes the degree of importance of a significant data signal transmitted and received between modules when the control condition is satisfied.

$$Di = F \times B \times I \quad (2)$$

For example, if the number of times a control condition "ERROR.rise" of the module interface Cr is satisfied is 1, the effective data amount of the module M1 (1000 bits) can be calculated by substituting the number of times the control condition is satisfied, "1", the number of bits of the data signal, "1", and the degree of importance "1000", into the equation 2.

Figure 15:
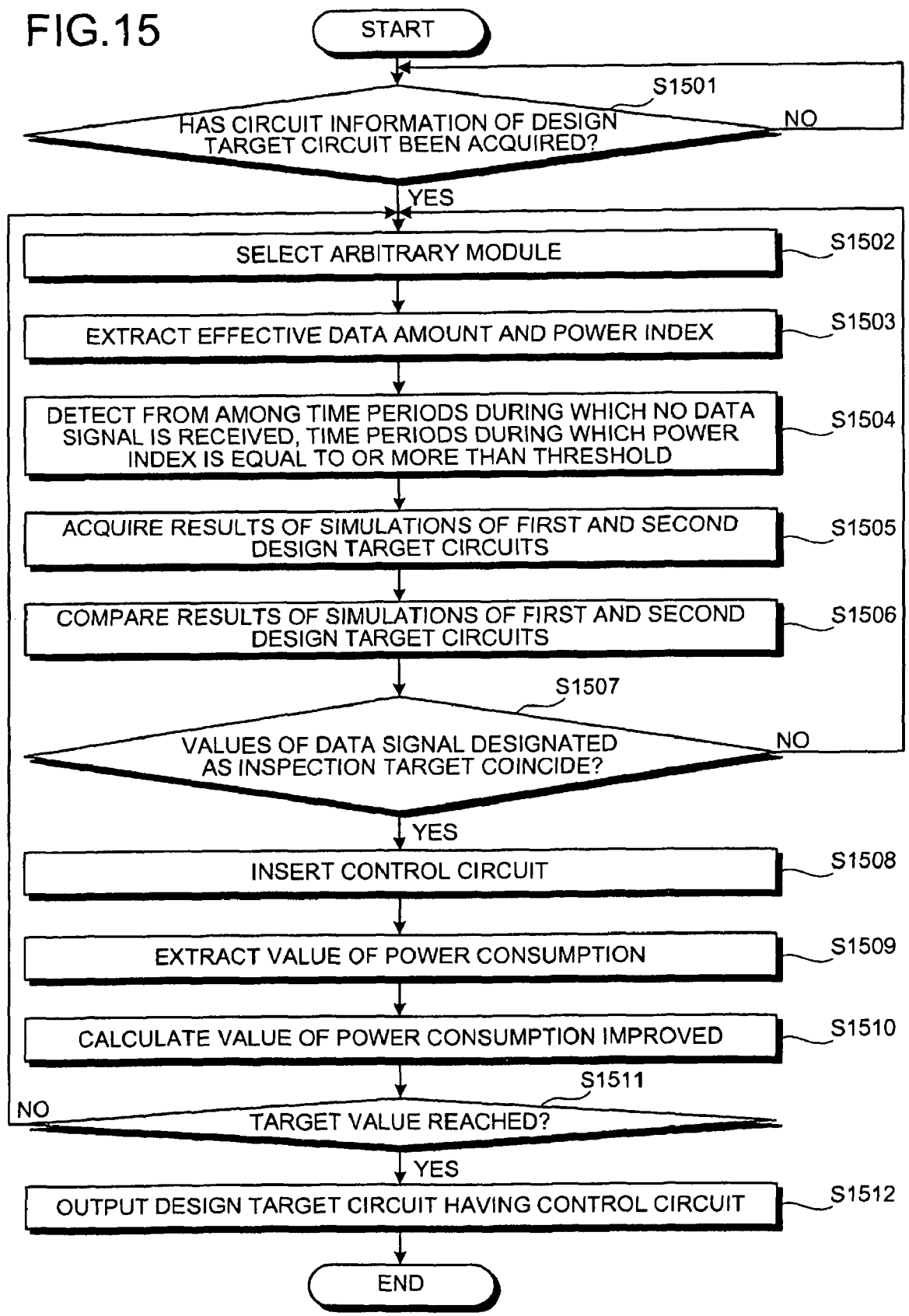
FIG. 15 is a flowchart of one example of a design support process executed in the design support apparatus.

FIG. 15 is a flowchart of one example of a design support process executed in the design support apparatus. As depicted in the flowchart, the design support apparatus 400 determines whether the acquiring unit 501 has acquired circuit information for a design target circuit (step S1501).

The design support apparatus 400 waits for the acquiring unit 501 to acquire the circuit information for the design target circuit (step S1501: NO), and when the acquiring unit 501 acquires the circuit information (step S1501: YES), the selecting unit 502 selects an arbitrary module from the design target circuit, based on the acquired circuit information (step S1502).

Subsequently, the extracting unit 503 accesses the time-series table DB 200 and extracts an effective data amount and a power index corresponding to the selected module (target module) (step S1503). Then, the detecting unit 504 detects from among time periods during which a recipient module does not receive a data signal, time periods during which the power index is equal to or more than a preset threshold, based on the extracted effective data amount and power index (step S1504).

Next, the acquiring unit 501 compares results of simulations in which the same data signal is applied to a design target circuit (first design target circuit) and a design target circuit into which a control circuit is inserted to stop supply of a clock to the target module continuously for the detected time periods (second design target circuit) (step S1505).

Then, the comparing unit 506 compares the simulation results of the first and the second design target circuits (step S1506), and the determining unit 507 determines whether values of a data signal designated as an inspection target before and after the insertion of the control circuit coincide (step S1507).

If the values of the data signal designated as an inspection target do not coincide (step S1507: NO), the process returns to step S1502 and the selecting unit 502 selects, from the design target circuit, a module that has not yet been selected.

Conversely, if the values of the data signal designated as an inspection target coincide (step S1507: YES), the inserting unit 508 inserts a control circuit into the design target circuit to stop the supply of a clock to the target module continuously for the time periods detected by the design target circuit (step S1508).

Subsequently, the extracting unit 503 accesses the time-series table DB and extracts values of power consumption in the target module (step S1509), and the calculating unit 509, based on the extracted values of power consumption, cumulates the values of power consumption in the target module for the detected time periods thereby calculating a value of power consumption improved by the insertion of the control circuit (step S1510).

The judging unit 510 judges whether the calculated value of power consumption reaches a target value (step S1511). If the calculated value does not reach the target value (step S1511: NO), the process returns to step S1502 and the selecting unit 502 selects, from the design target circuit, a module that has not yet been selected.

Conversely, if the calculated value reaches the target value (step S1511: YES), the output unit 505 outputs the design target circuit that additionally includes the control circuit (step S1512), thereby ending a series of the processing depicted in this flowchart.

According to the embodiment as explained above, with the use of a power index indicative of the potential of improving power consumption, it is possible to automatically detect, for each module, time periods during which clock gating is applicable. Further, since there is a high possibility of improving power consumption at the detected time periods, power consumption can be improved in an efficient and effective manner.

In addition, unlike a conventional design tool, the embodiment eliminates the need to analyze in detail the operation of a design target circuit to verify whether clock gating is applicable with respect to each module, and thus, the embodiment can be applied to large-scale circuits. Moreover, the embodiment eliminates the need for a person in charge of improving power consumption to comprehend detailed operation of a design target circuit, and therefore power consumption can be improved without decreasing working efficiency even if the person is not the designer of the design target circuit.

Consequently, according to the embodiment, it is possible to reduce the workload and time required to improve power consumption of a design target circuit.

The design support method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The design support apparatus 400 described in the present embodiment can be realized by an application specific integrated circuit (ASIC) such as a standard cell or a structured ASIC, or a programmable logic device (PLD) such as a field-programmable gate array (FPGA). Specifically, for example, the functional units (acquiring unit 501 to judging unit 510) of the design support apparatus 400 are defined in hardware description language (HDL), which is logically synthesized and applied to the ASIC, the PLD, etc., thereby enabling manufacture of the design support apparatus 400.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing therein a design support program that causes a computer to execute:
    selecting arbitrarily a module from a design target circuit;
    extracting, by accessing a table, a data amount and a power index corresponding to the module selected at the selecting, the table storing therein time-series data amounts for data signals transmitted from modules in the design target circuit and received by recipient modules, and power indexes indicative of a potential of improving power consumption in the modules according to data amount;
    detecting, from among time periods during which a recipient module does not receive a data signal, some time periods during which the power index meets a criterion for improving power consumption, the detecting being based on the data amount and the power index extracted at the extracting; and
    outputting said some time periods detected at the detecting.

2. The computer-readable, non-transitory medium according to claim 1, wherein the design support program further causes the computer to execute
    comparing results of simulations in which an identical data signal is supplied to the design target circuit and to a circuit identical to the design target circuit and further including a control circuit that stops, continuously for said some time periods detected at the detecting, a supply of a clock to the module selected at the selecting, and
    the outputting includes outputting a comparison result obtained at the comparing.

3. The computer-readable, non-transitory medium according to claim 2, wherein the design support program further causes the computer to execute
    inserting the control circuit into the design target circuit, based on the comparison result obtained at the comparing, and
    the outputting includes outputting the design target circuit that includes the control circuit inserted at the inserting.

4. The computer-readable, non-transitory medium according to claim 3, wherein the design support program further causes the computer to execute
    determining, based on the comparison result obtained at the comparing, whether values of a data signal coincide between the design target circuit and the circuit, and
    the outputting includes outputting a determination result obtained at the determining.

5. The computer-readable, non-transitory medium according to claim 4, wherein
    the inserting includes inserting the control circuit into the design target circuit when at the determining, the values of the data signal are determined to coincide.

6. The computer-readable, non-transitory medium according to claim 4, wherein
    the determining includes determining whether values of a data signal transmitted from the module selected at the selecting coincide between the design target circuit and the circuit.

7. The computer-readable, non-transitory medium according to claim 4, wherein
    the determining includes determining whether a value of a data signal output from the design target circuit coincides with a value of the data signal output from the circuit.

8. The computer-readable, non-transitory medium according to claim 4, wherein
    the determining includes determining whether a value of a data signal output from the design target circuit and a value of a data signal output from an arbitrary circuit element in the design target circuit respectively coincide in the design target circuit and in the circuit.

9. The computer-readable, non-transitory medium according to claim 3, wherein
    the table further stores therein a time-series estimated value of power consumption for each of the modules,
    the extracting further includes accessing the table and extracting values of power consumption for the module selected at the selecting,
    the design support program further causes the computer to execute calculating a value of power consumption improved by insertion of the control circuit into the design target circuit, the calculating including cumulating, based on the values of power consumption extracted at the extracting, the values of power consumption in the module for the time periods detected at the detecting, and
    the outputting further includes outputting the value of power consumption calculated at the calculating.

10. The computer-readable, non-transitory medium according to claim 9, wherein the design support program further causes the computer to execute
    judging whether the value of power consumption calculated at the calculating is less than a threshold, and the selecting further includes selecting, from the design target circuit, a module that has not been selected, when at the judging the value is judged to be less than the threshold.

11. The computer-readable, non-transitory medium according to claim 10, wherein
the selecting further includes accessing the table and selecting, from the design target circuit, a module having at least a given value of power consumption.

12. The computer-readable, non-transitory medium according to claim 11, wherein
the selecting further includes selecting, from the design target circuit, a module having the highest value of power consumption.

13. The computer-readable, non-transitory medium according to claim 1, wherein
the detecting further includes detecting, from among time periods during which the recipient module does not receive the data signal, some time periods during which the power index is equal to or more than a threshold.

14. A design support apparatus comprising:
a selecting unit that arbitrarily selects a module from a design target circuit;
an extracting unit that accesses a table and extracts a data amount and a power index corresponding to the module selected by the selecting unit, the table storing therein time-series data amounts for data signals transmitted from modules in the design target circuit and received by recipient modules, and power indexes indicative of a potential of improving power consumption in the modules according to data amount;
a detecting unit that, based on the data amount and the power index extracted by the extracting unit, detects, from among time periods during which a recipient module does not receive a data signal, some time periods during which the power index meets a criterion for improving power consumption; and
an output unit that outputs said some time periods detected by the detecting unit.

15. A design support method comprising:
selecting, using a processor, arbitrarily a module from a design target circuit;
extracting, by accessing a table, a data amount and a power index corresponding to the module selected at the selecting, the table storing therein time-series data amounts for data signals transmitted from modules in the design target circuit and received by recipient modules, and power indexes indicative of a potential of improving power consumption in the modules according to data amount;
detecting, from among time periods during which a recipient module does not receive a data signal, some time periods during which the power index meets a criterion for improving power consumption, the detecting being based on the data amount and the power index extracted at the extracting; and
outputting said some time periods detected at the detecting.

* * * * *